Nov. 17, 1970  E. P. WOLFER  3,540,270
REEL HARDNESS TESTER

Filed Jan. 16, 1969  2 Sheets-Sheet 1

INVENTOR.
Ernst P. Wolfer
BY
Thomas W. Flynn
ATTORNEY

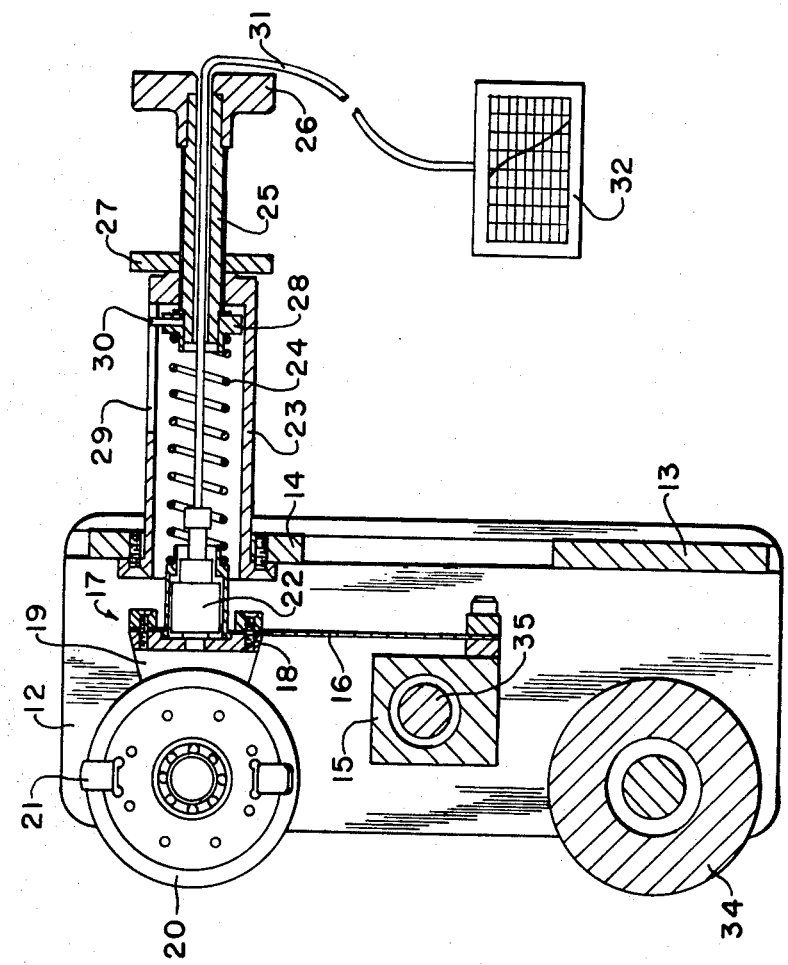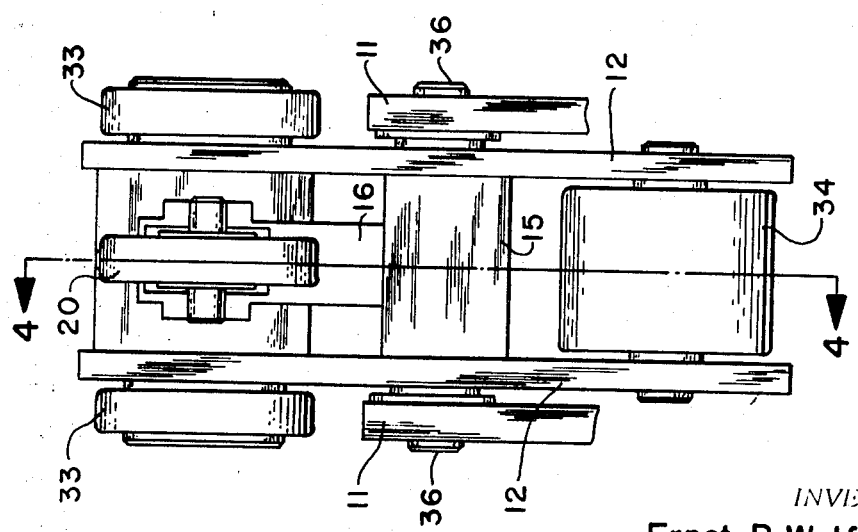

United States Patent Office 3,540,270
Patented Nov. 17, 1970

3,540,270
REEL HARDNESS TESTER
Ernst P. Wolfer, Schonenwerd, Switzerland, assignor to Westvaco Corporation, New York, N.Y., a corporation of Delaware
Filed Jan. 16, 1969, Ser. No. 791,690
Int. Cl. G01n 3/52
U.S. Cl. 73—78    10 Claims

ABSTRACT OF THE DISCLOSURE

Hardness of a reel of paper is tested as it is being built by holding a rotatable wheel having a protuberance on its surface against the surface of the reel, so that, that the wheel is driven by frictional contact with the reel, and measuring the force with which the wheel is rebounded from the reel each time the protuberance contacts the reel. A recorder may be used to give a continuous graphic readout of the amplitude of the rebounds and a traversing mechanism is provided to move the wheel axially of the reel and thus provide a hardness profile longitudinally thereof.

BACKGROUND OF THE INVENTION

Field of the invention

Hardness measurement by impacting the material being measured and obtaining an indication of the force with which the impacting means is rebounded from the surface of the material being measured.

Description of the prior art

One method of checking the uniformity of a continuous web of paper being manufactured on a papermaking machine is to check the hardness of the reel of paper being built axially along its length. Thus, if certain points along the reel are harder or softer than adjacent areas this would indicate a non-uniformity of the paper web being produced in the cross machine direction. Probably the most widely used method of checking reel hardness is for the backtender to periodically walk along the length of the reel being built and rap it with a stick and, depending upon the resulting sound, estimate the relative hardness or softness of the reel at those points. Although an experienced backtender can become quite proficient in judging the quality of the reel from the sound made when the reel is struck, it will be apparent that this type of evaluation is still a highly subjective one and highly susceptible to errors of human judgment.

SUMMARY

The present invention provides means for mechanically measuring the hardness of a reel of paper along its length and providing the paper manufacturer with definite quantitative indications of the reel hardness. This is accomplished by engaging the reel with a freely rotating resiliently mounted wheel having a protuberance projecting from its surface, which causes the wheel to rebound from the surface of the reel each time the protuberance strikes the reel. Any convenient means for indicating the force with which the wheel is rebounded from the reel may then be used to obtain a quantitative determination of the hardness of the reel at that point. Among the means which might be used to obtain an indication of the force with which the wheel rebounds from the reel are an accelerometer for measuring the acceleration of the wheel as it leaves the reel, a proximity gauge for measuring the distance which the wheel rebounds from the reel or a velocity measuring device for determining the instantaneous velocity of the wheel as it leaves the reel. The signal obtained from these or similar devices could then be directed to a conventional recording device to obtain a continuous trace of reel hardness. While the reel hardness tester may be utilized as a hand-held instrument, it is most conveniently utilized in conjunction with traversing mechanism which either continuously or intermittently moves the reel hardness tester up and down the surface of the reel to obtain a continuous trace.

BRIEF DESCRIPTION OF THE DRAWINGS

FIG. 3 is a view of the reel hardness tester per se taken on line 3—3 of FIG. 1; and FIG. 4 is a cross-sectional view taken on line 4—4 of FIG. 3.

DESCRIPTION OF THE PREFERRED EMBODIMENTS

Figure 2:
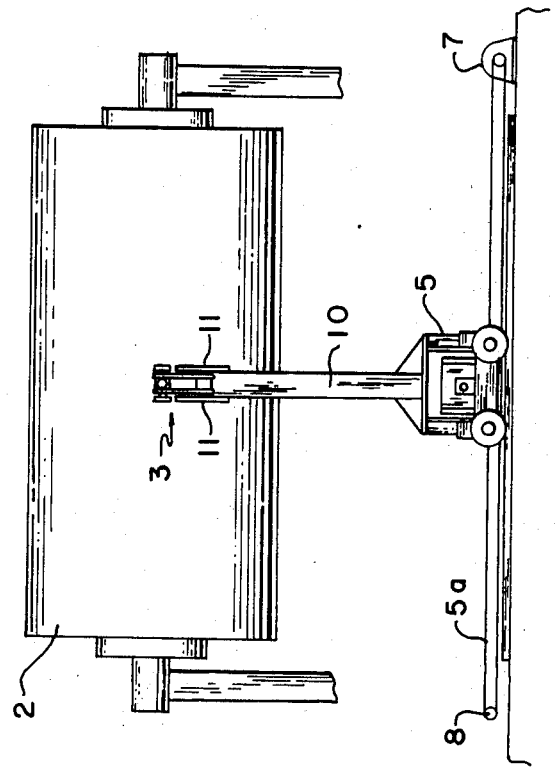
FIG. 2 is a view taken on line 2—2 of FIG. 1.
Figure 1:
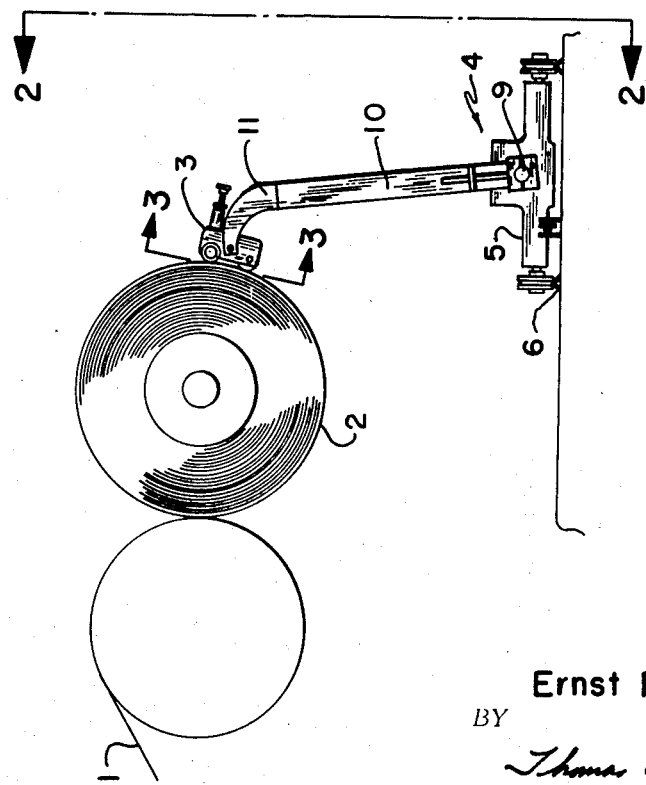
FIG. 1 of the drawings is an end view showing the reel hardness tester of the present invention mounted upon a traversing mechanism and in engagement with a reel being built.

With reference to FIG. 1 of the drawings, it will be seen that a web of paper 1 coming from the paper machine (not shown) is being wound onto a reel 2. The reel hardness tester 3 mounted upon a traversing mechanism 4 may be moved to selected spots along the reel to check the hardness at those points, may be moved continuously along the length of the reel to obtain a single longitudinal profile of the hardness thereof, or may be continuously operated to obtain a continuing series of hardness profiles.

The traversing mechanism may take any convenient form which permits the reel hardness tester to be moved parallel to the axis of the reel being built and perpendicularly thereto to accommodate the increasing thickness of the reel as the web is wound thereon. For purposes of illustration, the traversing mechanism associated with the present invention is shown to comprise a wheeled carriage 5 running on parallel tracks 6 and cable actuated by a power driven drum 7 and a pulley 8; whereby a cable 5a may be attached to both ends of the wheeled carriage, trained about the drum and pully, and by rotation of the drum the carriage caused to move back and forth along the tracks. A rotary actuator 9 mounted upon the carriage causes the boom 10 and the support arms 11 carried thereby to move in an arc and maintain the reel hardness tester 3 in contact with the reel as it is built and its diameter thereby increased.

Turing now to FIGS. 3 and 4 of the drawings, it will be seen that the reel hardness tester comprises a supporting frame including side plates 12 joined by a tie plate 13, a mounting plate 14 and a bearing block 15. A blade spring 16 is attached to one end to the bearing block and at its opposite end carries a yoke member 17. The yoke member comprises a bight portion 18 and a pair of spaced parallel arms 19. An impacting wheel 20 is rotatably mounted between the arms 19 and has extending therefrom a protuberance 21.

As mentioned previously, any convenient means 22 for indicating the force with which the wheel 20 is rebounded from the surface of a reel as it is struck by the protuberance 21 may be utilized. For example, an accelerometer might be mounted on the bight portion of the yoke member to measure the acceleration of the impacting wheel 20 as it is rebounded from the surface of the reel 2. A spring housing 23 is attached to the mounting plate 14 and carries a coil spring 24 attached at one end to the force indicating device 22. A threaded rod 25 having a handle 26 is threaded through one end 27 of the spring housing; whereby rotation of the handle 26 causes the rod to move in and out of the spring housing and by means of the spring follower 28 caused the force required to deflect the blade spring 16 to vary. A slot 29 may be formed in one part of the spring housing whereby a pin 30 carried by the follower together with indicia imprinted along the edges of the slot may give an indication of the force being exerted against the blade spring 16 by the coil spring 24. Signals produced by the force indicating device 22 may be conveyed by means of the cable 31 to a conventional recorder 32 to provide a graphic representation of the hardness of the reel being tested.

A guide wheel 33 is rotatably mounted on each of the side plates 12 with the axes thereof in alignment with each other and in substantial alignment with the axis of the impacting wheel 20. Since the diameter of all three wheels is approximately the same, the impacting wheel 20 will be moved into approximately the same position each time it engages a reel 2. A roller 34 is rotatably mounted between the side plates 12 and serves to balance the reel hardness tester against the surface of the reel 2. The bearing block 15 is internally bored to receive a pivot pin 35 which is rotatably mounted therein and has portions 36 extending outwardly of each of the side plates 12. The support arms 11 are attached to the portions 36 of the pivot pin 35 and thus, as the support arms 11 pivot about the rotary actuator 9, the wheels 20 and 33 and the roller 34 remain in contact with the surface of the reel 2; thereby insuring proper positioning of the device with respect to the reel being tested.

While a specific embodiment of the invention has been described for purposes of illustration it will be apparent that modifications thereof will be obvious to those skilled in the art within the scope of the appended claims.

I claim:
1. A reel hardness tester comprising:
   (a) a supporting frame,
   (b) an impacting wheel rotatably and resiliently mounted on said frame,
   (c) a protuberance extending outwardly from the periphery of said wheel; whereby upon rotation of said wheel by frictional contact with a rotating reel said protuberance strikes said reel and causes said wheel to rebound from said reel on said resilient mounting, and
   (d) means for indicating the force with which said wheel rebounds from said reel.
2. The apparatus of claim 1 wherein:
   (a) said last named means comprises means for measuring the distance said wheel rebounds from said reel.
3. The apparatus of claim 1 wherein:
   (a) said last named means comprises means measuring the velocity of said wheel as it rebounds from said reel.
4. The apparatus of claim 1 wherein:
   (a) said last named means comprises means for measuring the acceleration of said wheel as it rebounds from said reel.
5. The apparatus of claim 1 further comprising:
   (a) a pair of rotatable guide wheels each having an axis fixed with respect to said supporting frame and in substantial alignment with each other and the axis of said impacting wheel.
6. The apparatus of claim 5 wherein:
   (a) said supporting frame includes a pair of spaced parallel side plates,
   (b) a bearing block extends between said side plates,
   (c) a blade spring is attached at one end thereof to said bearing block, and
   (d) said impacting wheel is mounted on the other end of said blade spring.
7. The apparatus of claim 6 wherein:
   (a) a mounting plate extends between said side plates in spaced relation to said bearing block, and
   (b) means is provided mounted on said mounting plate for varying the force required to deflect said blade spring.
8. The apparatus of claim 7 wherein:
   (a) a roller is rotatably mounted and extends between said side plates with the axis of said roller in spaced parallel relationship to the axes of said wheels.
9. The apparatus of claim 8 wherein:
   (a) means is provided for moving said supporting frame in a first direction parallel to the axes of said wheels and in a second direction normal to the axes of said wheels.
10. A reel hardness tester comprising:
   (a) a supporting frame including:
      (i) a pair of spaced parallel side plates,
      (ii) a mounting plate extending between and attached to said side plates, and
      (iii) a bearing block extending between and attached to said side plates,
   (b) a blade spring attached to said bearing block and extending upwardly toward said mounting plate,
   (c) a yoke member mounted on said blade spring adjacent said mounting plate,
   (d) said yoke member rotatably supporting an impacting wheel having a protuberance extending outwardly from the periphery thereof,
   (e) an accelerometer mounted on said yoke member,
   (f) a coil spring housing attached to said mounting plate and carrying a coil spring therewithin,
   (g) said coil spring being joined at one end thereof to said yoke member and at the other end thereof to an adjusting handle,
   (h) a pair of guide wheels each rotatably mounted on one of said side plates with the axes thereof substantially aligned therewith and with the axis of said impacting wheel,
   (i) a roller rotatably mounted on and extending between said side plates,
   (j) means defining an opening extending axially of said bearing block,
   (k) an axle rotatably received within said opening and extending outwardly of said side plates,
   (l) a pair of support arms each positioned outwardly of said side plates and engaging an outwardly extending portion of said axle, and
   (m) means for moving said support arms in a first direction parallel to and a second direction normal to the axes of said wheels.

References Cited

FOREIGN PATENTS 1,515,998   3/1968   France.

OTHER REFERENCES

M. Leisenberg: German application 1,038,970, Sept. 11, 1958, 3 pages.

RICHARD C. QUEISSER, Primary Examiner

C. E. SNEE III, Assistant Examiner